April 23, 1963     F. J. CARSON ETAL     3,086,376
APPARATUS FOR BENDING GLASS SHEETS Filed Jan 3, 1956     2 Sheets-Sheet 1

INVENTORS
Frank J. Carson and
BY Herbert A. Leflet, Jr.
Nobbe & Swope
ATTORNEYS

April 23, 1963 F. J. CARSON ETAL 3,086,376
APPARATUS FOR BENDING GLASS SHEETS
Filed Jan. 3, 1956 2 Sheets-Sheet 2

INVENTORS
Frank J. Carson and
BY Herbert A. Leflet, Jr.
Nobbe & Swope
ATTORNEYS

United States Patent Office 3,086,376
Patented Apr. 23, 1963

3,086,376
APPARATUS FOR BENDING GLASS SHEETS
Frank J. Carson and Herbert A. Leflet, Jr., Toledo, Ohio, assignors to Libbey-Owens-Ford Glass Company, Toledo, Ohio, a corporation of Ohio
Filed Jan. 3, 1956, Ser. No. 556,986
12 Claims. (Cl. 65—288)

This invention relates generally to the bending of glass sheets, and more particularly to improved apparatus for forming complex curvatures in bent glass sheets.

In the heating and bending of glass sheets to compounded curvatures on bending molds, for example a sheet having a curved central portion with a relatively large radius of curvature and adjoining end sections with relatively short radii of curvature, it has been found desirable to establish a temperature differential in the sheet, prior to and during bending, between the sharply curved end portions and the more gradually curved central portion. It is preferable that the end portions of the sheet are heated to a higher temperature than the central portion so that the end portions may conform to the more sharply curved portions of the mold while the central sheet portion will not become heated to the extent to which it will sag when supported on the mold.

Therefore, it is an important object of the present invention to provide apparatus associated with a bending mold for controlling the heating of selected portions of a glass sheet when supported on the mold and heated.

Another object of the invention is to provide a heat absorbing member associated with a bending mold and adapted to retard the heating of selected portions of a glass sheet when mounted on the mold.

A further object of the invention is to provide a metallic heat absorbing member associated with a bending mold and having a high rate of heat absorption per unit area.

Other objects and advantages of the invention will become more apparent during the course of the following description when taken in connection with the accompanying drawings.

In the drawings, wherein like numerals are employed to designate like parts throughout the same:

Briefly stated, the present invention comprises apparatus for retarding the heating of selected portions of a glass sheet, when mounted on a bending mold, comprising a foraminous metallic heat absorbing member mounted beneath the shaping surface of the mold.

Figure 1:
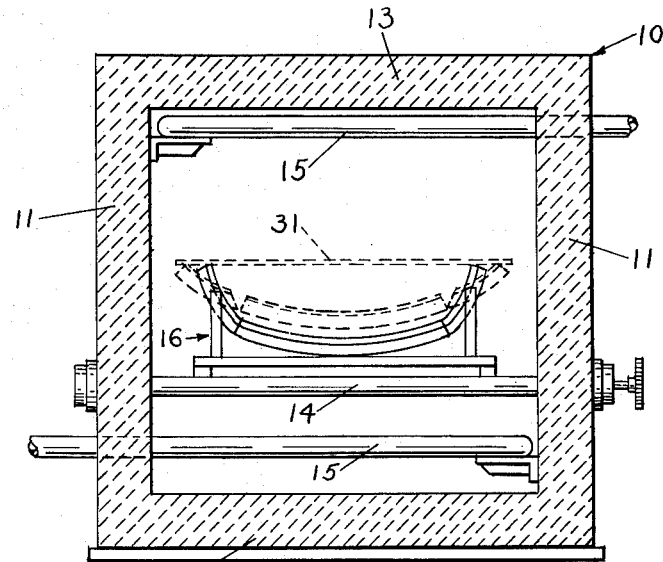
FIG. 1 is a transverse section through a typical glass bending furnace.

With reference now to the drawings, and particularly to FIG. 1, there is shown in sectional view a bending furnace 10 having upstanding side walls 11, a bottom wall 12 and a roof 13. To convey bending molds supporting glass sheets through the furnace, a plurality of rotatable rolls 14 are provided upon which the supporting racks of the molds may travel.

The furnace 10 may be heated by means of radiant tubes 15 disposed both above and below the conveyor rolls 14 and adapted to direct radiant heat toward the path of the bending molds carried upon the conveyor. If desired, the radiant tubes may be eliminated and the furnace heated by a pattern of radiant burners as shown in the co-pending application Serial No. 470,424 of Gerald White and William P. Bamford, now abandoned.

Figure 2:
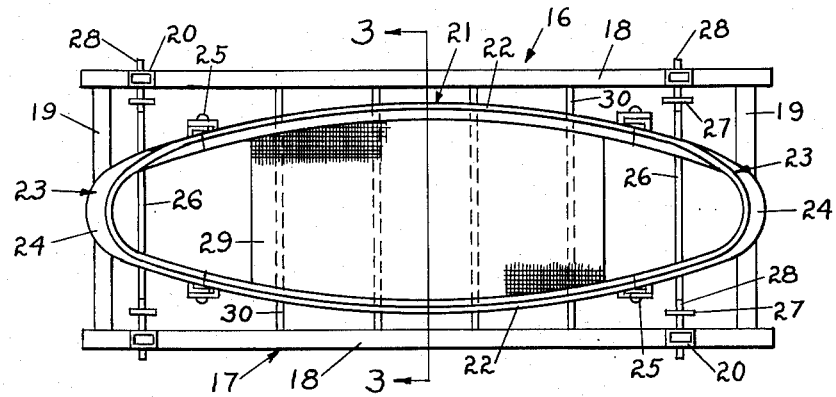
FIG. 2 is a plan view of a glass bending mold having the improved heat absorbing member associated therewith.

Although the heat absorbing member provided by the invention may be used in combination with various types of bending molds, the mold 16 shown in FIG. 2 is of the general type used in bending glass sheets for panoramic windshields. The mold 16 is supported by a substantially rectangular rack 17 comprising spaced side bars 18 joined to one another at their outermost ends by end bars 19. Extending upwardly from each of the side bars 18 adjacent the outermost ends thereof are column members 20 which support the mold 16.

The mold is of the commonly used outline type and comprises a center section 21, formed of a pair of spaced shaping rails 22, and end sections 23 formed by a shaping rail 24 which is movably joined to the center section by hinges generally designated by the numeral 25. The mold sections are supported for movement from an open position (phantom lines in FIG. 1) to a closed position (full lines in FIG. 1) by means of a transverse rod 26 secured to each of the end section rails 24 and extending outwardly therefrom to have its opposite ends rotatably received in links 27 swingably secured by pins 28 to the column members 20.

As shown in FIG. 1, the upper surfaces of the mold center section rails 22 are of a relatively shallow curvature while the surfaces of the opposite end section rails 24 are of a relatively sharp curvature and, together, they act to form a shaping surface for forming the glass sheet to be bent. As previously mentioned, the mold 16 is of the general type commonly used in bending panoramic or hook-type windshields. In bending such windshields, it is desirable that the sharply curved portions of the bent glass sheet, which correspond roughly to the mold end sections 23, receive a relatively greater amount of heat as compared to the sheet portion corresponding to the center section 21 of the mold, so that the sheet end portions may properly conform to the more sharply curved mold end sections while the center portion of the sheet is not heated excessively which could cause undesirable sag. Therefore, it is necessary that a differential heating of the sheet be effected. Generally speaking, this differential heating may be effected in one of two ways; additional heat may be concentrated upon the end portions of the sheet to raise these portions to a higher temperature, or the heating of the central portion of the sheet may be retarded with respect to the end portions. It has been found preferable to retard the heating of the central portion of the sheet since by so doing, the tendency of the sheet to sag between the supported longitudinal edges thereof and thus produce an unacceptable degree of sag is eliminated because the temperature of this portion of the sheet is maintained below that at which the objectionable sag will develop.

Figure 3:
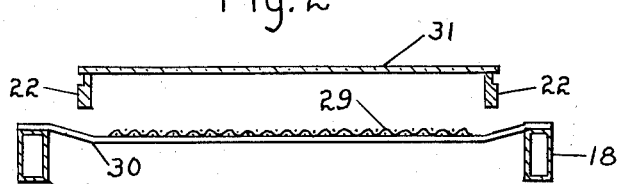
FIG. 3 is a transverse section taken along the line 3—3 of FIG. 2.

In accordance with the present invention, the retarding of the heating of the central portion of the glass sheet is affected by means of a foraminous, metallic heat-absorbing member 29 mounted beneath and within the projected area of the mold shaping surface as defined by the rail sections 22 and 24. As shown in FIGS. 2 and 3, the member 29 is mounted within the confines of the rail sections 22 and extends longitudinally of the mold to a point somewhat short of the inner ends of the sharply curved mold end sections 23 and thus underlies the central portion of a glass sheet when mounted on the mold. To support the member 29, a plurality of rods 30 extend therebeneath and are secured to the rack side bars 18.

Figure 5:
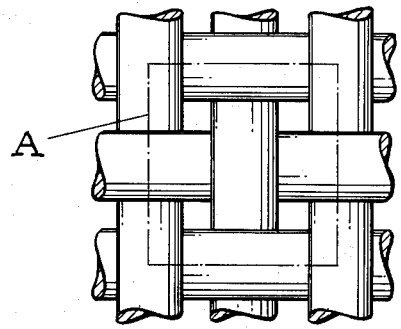
FIG. 5 is a fragmentary plan view of one form of the improved heat absorbing member of the invention.
Figure 6:
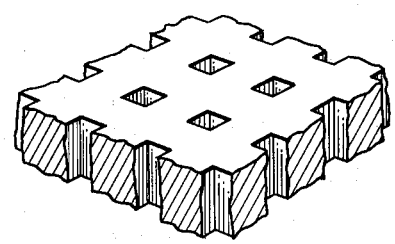
FIG. 6 is a similar view of another modified form.
Figure 7:
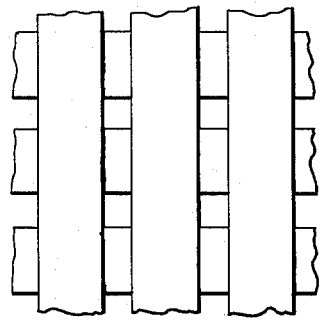
FIG. 7 is a fragmentary perspective view of a further modified form of the heat absorbing member.

According to the customary method of bending glass sheets upon a hinged mold such as the mold 16, the mold sections are spread to the open position and a glass sheet 31 to be bent is mounted thereon. The mold is then passed through a bending furnace such as the furnace 10 wherein the glass sheet is subjected to successive zones of increasing temperature until the sheet reaches bending temperature at which time the sheet begins to sag and the mold sections move from the open to the closed position. While moving through the furnace, the foraminous member 29 absorbs heat from the furnace atmosphere adjacent thereto. By being positioned beneath the undersurface of the central portion of the glass sheet 31, the heat absorber 29 withdraws heat from the portion of the furnace atmosphere roughly corresponding to the central portion of the sheet and thus less heat is available adjacent the undersurface of the sheet to raise the temperature thereof. It has been found that the heat withdrawal rate or capacity of the member is dependent upon its surface area exposed to heat, and by utilizing a foraminous member a greatly increased surface area is obtained. For example, if the member 29 is composed of a grid of 1/8" diameter rods spaced from one another both transversely and longitudinally at intervals of 3/16", as shown in FIG. 5, an area of the grid 3/8" long and 3/8" wide would have a surface area exposed to furnace heat of approximately 0.88 square inches as compared to the same width and length of a solid member which would have a surface area exposed to heat of approximately 0.28 square inches. In other words, through the use of a heat absorbing member of the novel type herein disclosed, there is provided more than twice as much surface area available for absorbing furnace heat. If a grid of 1/8" square rods as shown in FIG. 7 is used, a 3/8" square area of the member would have a surface area of approximately 1.1 square inches and is therefore somewhat more advantageous to use as compared to a grid of round rods, while an arrangement of 1/8 inch square rods, interwoven in the same manner as the round rods of FIG. 5, will have an even greater exposed surface area.

Figure 4:
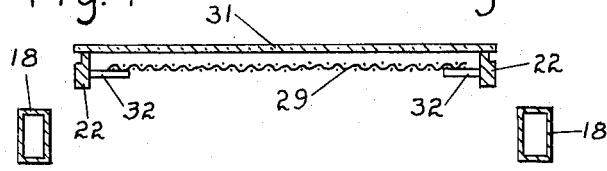
FIG. 4 is a sectional view showing a modified form of the invention.

FIG. 4 shows a sectional view of a modification of the invention wherein the heat absorbing member 29 is secured immediately beneath the shaping surface of the mold center section by means of dowels 32 secured to the side rails 22. By so positioning the heat absorbing member, the effect on the glass is emphasized since, when the mold is in the open position, the member 29 is closer to the glass sheet supported thereabove and thus more effective.

Although the heat absorbing member 29 has been shown, in the drawings, positioned beneath the mold center section, it will be understood that the heat absorbing member could be of various sizes, and would operate substantially as described when positioned above the mold or beneath other mold portions such as either, or both, of the mold end sections 23 if it is desired to retard the heating of other portions of a glass sheet to be bent.

It is to be understood that the form of the invention herewith shown and described is to be taken as a preferred embodiment of the same and various changes may be resorted to without departing from the spirit of the invention or the scope of the subjoined claims.

We claim:

1. A glass bending mold adapted to bend a glass sheet in a hot atmosphere and comprising an upper shaping surface conforming in elevation and outline to the shape of the bent glass sheet, said shaping surface including a relatively flat area portion, and a heat absorbing member of open mesh configuration aligned with and spaced from the relatively flat area portion and positioned so as to face a surface of the glass sheet when supported on said shaping surface.

2. A mold according to claim 1, wherein the heat absorbing member is located below the upper shaping surface.

3. An aparatus for use in bending glass sheets in a hot atmosphere including a mold comprising a shaping rail having a shaping surface conforming in elevation to the shape to which the glass sheets are to be bent and whose projected periphery defines an open area, and a foraminous heat absorbing member comprising a grid of spaced rod-like elements formed with a surface area greater than a solid member of the same dimensions and having a portion thereof within said area below the shaping surface of said shaping rail and facing and directly exposed to a surface of the glass sheet when supported on said shaping surface.

4. A glass bending mold adapted to bend a glass sheet in a hot atmosphere and comprising an upper shaping surface conforming in elevation to the shape of the bent glass sheet, and a heat absorbing member of open mesh configuration spaced from said shaping surface and positioned so as to face a surface of the glass sheet when supported on said shaping surface.

5. A glass bending mold adapted to bend a glass sheet in a hot atmosphere and comprising a curved shaping rail having a shaping surface conforming in elevation to the shape to which the glass sheets are to be bent and whose projected periphery defines an open area, and a foraminous heat absorbing member spaced from said shaping surface with a portion thereof within said open area and positioned so as to face a surface of the glass sheet when supported on said shaping surface, the space between said portion of the heat absorber and said sheet being free of obstruction so that said portion of said foraminous heat absorber is directly exposed to said glass sheet.

6. A bending mold as defined in claim 5 wherein the foraminous member is metal.

7. A bending mold as defined in claim 5 in which the foraminous heat absorbing member is located below said shaping surface and secured to said rail.

8. A bending mold as defined in claim 5 in which said mold comprises a plurality of shaping rail sections arranged in end to end relation and includes movable shaping rail sections, means are provided and secured to said movable shaping rail sections for mounting the same for movement from an open spread-apart position to receive a flat glass sheet to a closed position in which the shaping surfaces on said shaping rail sections define the curvature to which a glass sheet is to be bent, and the foraminous heat absorbing member is secured to one of said movable shaping rail sections below the shaping surface thereof.

9. A bending mold as defined in claim 5 wherein the foraminous member is formed with a surface area greater than a solid member of the same dimensions.

10. A bending mold as defined in claim 9 in which the foraminous member is located below said shaping surface.

11. A bending mold as defined in claim 5 in which the heat absorbing member is of a metallic grid-like structure.

12. A mold as defined in claim 11 wherein the metallic grid-like structure has a surface area greater than a solid member of the same dimensions.

References Cited in the file of this patent

UNITED STATES PATENTS

| | | |
|---|---|---|
| 1,360,587 | Said | Nov. 30, 1920 |
| 1,531,364 | Whiting | Mar. 31, 1925 |
| 2,348,278 | Boyles et al. | May 9, 1944 |
| 2,482,698 | Tillyer | Sept. 20, 1949 |
| 2,641,456 | Schmertz | June 9, 1953 |
| 2,720,729 | Rugg | Oct. 18, 1955 |

FOREIGN PATENTS

| | | |
|---|---|---|
| 1,097,088 | France | June 29, 1955 |
| 745,992 | Great Britain | Mar. 7, 1956 |